UNITED STATES PATENT OFFICE.

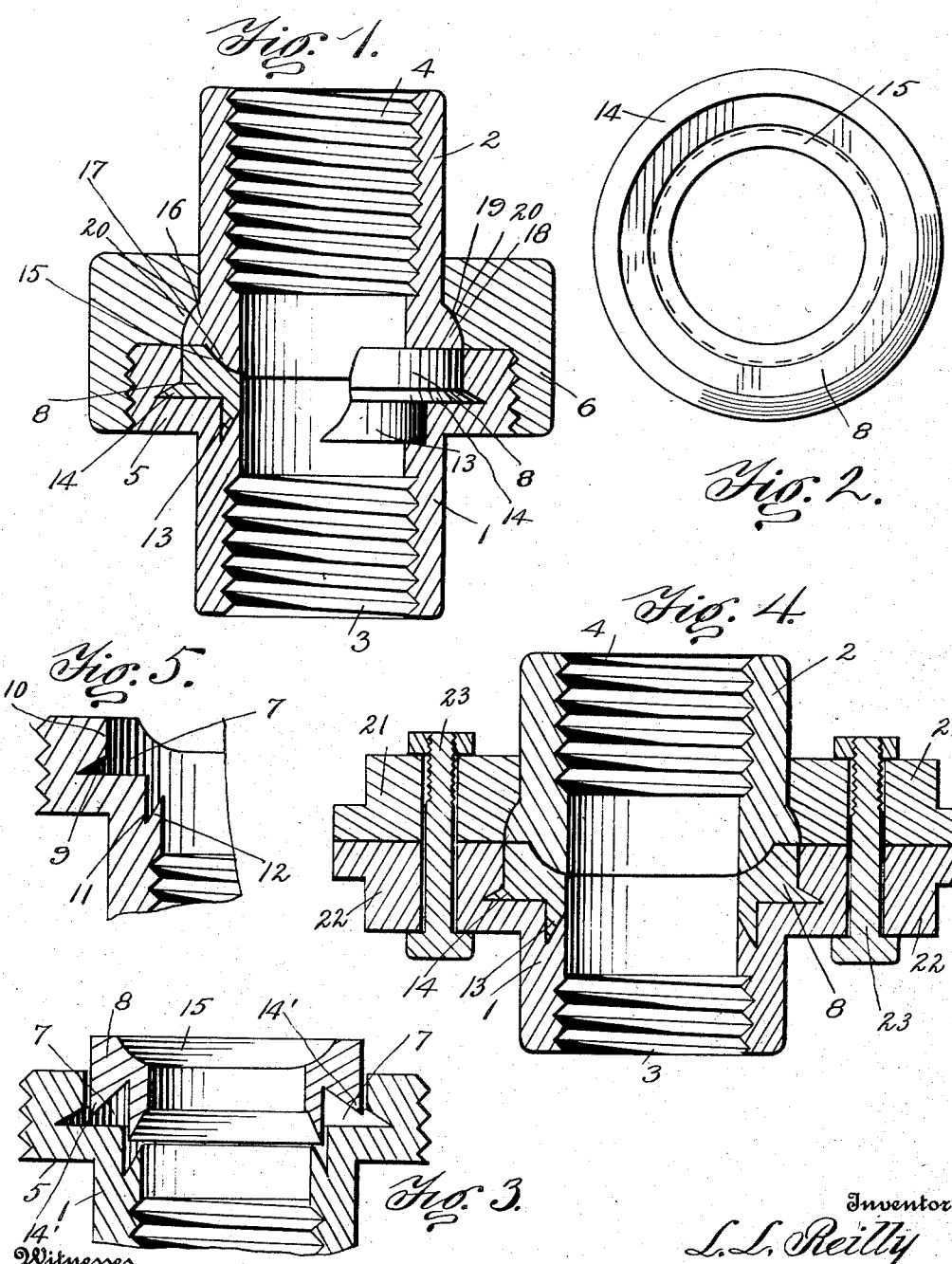

LINCOLN L. REILLY, OF BOSTON, MASSACHUSETTS.

PIPE-UNION.

1,098,974.  Specification of Letters Patent.  Patented June 2, 1914.

Application filed February 7, 1911, Serial No. 607,164. Renewed October 31, 1913. Serial No. 796,583.

*To all whom it may concern:*

Be it known that I, LINCOLN L. REILLY, citizen of the United States, residing at Boston, in the county of Suffolk and State of Massachusetts, have invented certain new and useful Improvements in Pipe-Unions, of which the following is a specification.

This invention relates to improvements in pipe unions and has for its object to form a fluid tight joint for pipe connections.

With the above and other objects in view, I have invented the union illustrated in the accompanying drawings in which, Figure 1 is a longitudinal sectional view of a pipe union, Fig. 2 is a top plan detail view of a union seat, Fig. 3 is a detail sectional view of a union seat and female member of a union showing how the seat is forced into place in the recessed female member, Fig. 4 is a view similar to Fig. 1 showing a modified coupling means and Fig. 5 is a fragmental sectional view of a female union member.

Referring to the accompanying drawings 1 is a female member of a pipe union and 2 the male member of the union. The ends 3 and 4 of these members are internally screwthreaded to receive screwthreaded pipe ends.

The female member 1 is provided with a head 5 which is externally screwthreaded for engagement with the nut 6, and provided with internal recesses 7 to receive the union seat 8. The recess 7 as shown in the drawings is provided with an annular horizontal wedge-shaped extension 9 having an inclined upper wall 10 and a vertical wedge shaped annular extension 11 having an inner inclined wall 12. This recess is to receive the seat 8, made of aluminum, brass or any soft metal, which is provided with wedge shaped projections 13 and 14, which conform to the shape of the annular extensions 9 and 11 of the recess 7. This seat is inserted into the recess 7 in the form and manner shown in Fig. 3 before the projection 14 is extended horizontally, then sufficient pressure is brought to bear thereagainst to force it home and to cause the depending projection 14' to bend outwardly and enter the extension 9 of the recess 7. The member 8 is also provided with an annular arcuate recess 15 upon which seats the male member 2, the head 16 of which has an arcuate outer surface 19 which is engaged by the arcuate recess in the nut 6. All of the arcuate surfaces above described conform as to the arc thereof, thereby all acting in conjunction to bring the proper pressure to bear in the right direction upon the seat 8 to firmly wedge it into sealed connection with the female member. The nut 6 engaging the male member is screwed tightly onto the female member causing the hard metal of the male member to closely contact the soft metal of the union seat and at the same time forcing the soft metal so tightly into contact with the hard metal of the female member that the joint is securely sealed against leakage of fluid therefrom, no matter how great a pressure the fluid is under.

In Fig. 4 a modified form of coupling is shown in which an internally recessed ring 21 is used in place of the nut which is adapted to abut the flange 22 of the female member. Opposing openings are provided in the flange and ring through which bolts 3 are adapted to draw the members into clamped relation.

I claim and desire to secure by Letters Patent:—

1. A pipe coupling member having a passage and a relatively large recess facing said passage, a wedge-shaped recess extending from said large recess and having one wall merging into said passage and the other wall concentric with the passage wall, and a second wedge-shaped recess extending from said large recess and having one wall in a plane transverse to the axis of said passage and the other wall at an acute angle to said transverse wall, and a filling member in said recess to coöperate with a second coupling member.

2. A pipe coupling member having a passage and a relatively large recess facing said passage, a wedge-shaped recess extending from said large recess and having one wall merging into said passage and the other wall concentric with the passage wall, a second wedge-shaped recess extending from said large recess and having one wall in a plane transverse to the axis of said passage and the other wall at an acute angle to said transverse wall, a filling member in said recess to coöperate with a second coupling member, said filling member having a flange with an inclined surface adapted to be engaged by said first wall and thereby directed into said first wedge-shaped recess.

3. A pipe coupling member having a passage and a relatively large recess facing said passage, a wedge-shaped recess extending from said large recess and having one wall merging into said passage and the other wall concentric with the passage wall, and a second wedge-shaped recess extending from said large recess having one wall in a plane transverse to the axis of said passage and the other wall at an acute angle to said transverse wall, a filling member in said recess to coöperate with a second coupling member, said filling member having a reduced portion adapted to seat in said second wedge-shaped recess, said reduced portion having an inclined surface terminating in said passage.

4. A pipe coupling member having a passage and a relatively large recess facing said passage, with a wall parallel with and a wall transverse to said passage, a relatively small wedge-shaped recess extending from said first recess and having one wall in a plane parallel to said passage and another wall at an acute angle to said parallel wall and terminating in said passage, and a filling member in said recesses to coöperate with a second coupling member.

In testimony whereof I affix my signature in presence of two witnesses.

LINCOLN L. REILLY.

Witnesses:
WILLIAM E. LUDDEN,
LOYE MONAHAN.